United States Patent
Cardonha et al.

(10) Patent No.: US 9,372,086 B2
(45) Date of Patent: Jun. 21, 2016

(54) CONTROL SYSTEM FOR INDICATING IF PEOPLE CAN REACH LOCATIONS THAT SATISFY A PREDETERMINED SET OF CONDITIONS AND REQUIREMENTS

(71) Applicant: International Business Machines Corporation, Armonk, NY (US)

(72) Inventors: Carlos Henrique Cardonha, Sao Paulo (BR); Dimitri Kanevsky, Ossining, NY (US); Peter K. Malkin, Yorktown Heights, NY (US); Seetharami R. Seelam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 14/027,750

(22) Filed: Sep. 16, 2013

(65) Prior Publication Data

US 2014/0316702 A1    Oct. 23, 2014

Related U.S. Application Data

(63) Continuation of application No. 13/865,525, filed on Apr. 18, 2013.

(51) Int. Cl.
*G01C 21/26*   (2006.01)
*G01C 21/20*   (2006.01)
*G01C 21/34*   (2006.01)

(52) U.S. Cl.
CPC ............ *G01C 21/20* (2013.01); *G01C 21/3407* (2013.01); *G01C 21/3423* (2013.01)

(58) Field of Classification Search
CPC .... G01C 21/34; G01C 21/20; G01C 21/3407; G01C 21/3423; G08G 1/096838
USPC .............. 701/533, 537, 414; 455/420, 456.1
See application file for complete search history.

(56) References Cited

U.S. PATENT DOCUMENTS

| 6,633,232 B2 | 10/2003 | Trajkovic et al. |
| 8,126,759 B2 | 2/2012 | Robertson et al. |

(Continued)

FOREIGN PATENT DOCUMENTS

| CN | 101944289 A | 1/2011 |
| CN | 102436488 A | 5/2012 |
| JP | 2006244069 A * | 9/2006 |

OTHER PUBLICATIONS

Office Action dated Jul. 17, 2014 received in the parent U.S. Appl. No. 13/865,525.

IBM; "VTAM V4.3: High Performance Routing (HPR) Early User Experiences"; IBM International Technical Support Organization—Raleigh Center, www.ibm.com/redbooks/sg244507 . . . , Sep. 1995, pp. 1-132.

(Continued)

*Primary Examiner* — Tuan C. To
*Assistant Examiner* — Isaac Smith
(74) *Attorney, Agent, or Firm* — Scully, Scott, Murphy & Presser, P.C.; Louis J. Percello, Esq.

(57) ABSTRACT

Managing routes to meet one or more predetermined conditions, in one aspect, may comprise receiving user information associated with a user via a user's device. Based on the user information, at least a target location to where the user is traveling may be determined. Path information associated with one or more intermediary locations leading to the target location may be received. The path information may be received automatically from one or more sensors installed at the respective intermediary locations for detecting the path information. A route strategy that meets one or more conditions may be estimated by analyzing the user information and the path information. The user information may be obtained automatically from one or more of social network profile data associated with the user, electronic calendar data associated with the user, or historical data associated with the user stored in a user profile database.

11 Claims, 3 Drawing Sheets

(56) References Cited

U.S. PATENT DOCUMENTS

| | | | |
|---|---|---|---|
| 8,712,675 B2 | 4/2014 | Grigsby et al. | |
| 2008/0293430 A1* | 11/2008 | Blom et al. | 455/456.1 |
| 2010/0027527 A1* | 2/2010 | Higgins | H04W 4/18 370/351 |
| 2010/0169002 A1* | 7/2010 | Hilliar Isaacson | 701/207 |
| 2010/0179756 A1 | 7/2010 | Higgins et al. | |
| 2011/0219089 A1 | 9/2011 | Robertson et al. | |
| 2013/0231858 A1* | 9/2013 | Bourne | H04W 4/023 701/439 |

OTHER PUBLICATIONS

Anonymous; "Storing information Associated with User Interactions with a Good or Service"; http://www.ip.com/pubview/IPCOM000182426D; Apr. 30, 2009. pp. 1-32.

Office Action dated Feb. 20, 2015 received in the parent U.S. Appl. No. 13/865,525.

U.S. Office Action dated Jan. 14, 2016 issued in U.S. Appl. No. 13/865,525, pp. 1-25.

* cited by examiner

CONTROL SYSTEM FOR INDICATING IF PEOPLE CAN REACH LOCATIONS THAT SATISFY A PREDETERMINED SET OF CONDITIONS AND REQUIREMENTS

CROSS-REFERENCE TO RELATED APPLICATIONS

This application is a continuation of U.S. Ser. No. 13/865,525, filed on Apr. 18, 2013, the entire content and disclosure of which is incorporated herein by reference.

FIELD

The present application relates generally to computers, and computer applications, and more particularly to a route management, for example, a control system for indicating if people can reach locations that satisfy a predetermined set of conditions and/or requirements.

BACKGROUND

In situations in which people need to travel to a location or event, and in which the people have the choice regarding the arrival time, the travel path and/or positioning, one may want to know the best strategy to follow given a set of conditions and requirements and in accordance with one or more priorities. For example, a passenger who is about to take the subway (underground transit) may want to get on board or enter in the less densely occupied car or in the ones where the passenger may (or will) find people that he would like to meet. In another context, a person attending an event (e.g., sports games, theatre) may want to avoid coming early and being in a seat where the person might have to stand up constantly to allow other people arriving later to pass to reach their seats. Inventors in the present disclosure have recognized that enabling the identification of such or other like strategies may improve user experience in a variety of scenarios.

BRIEF SUMMARY

A method of managing routes to meet one or more predetermined conditions, in one aspect, may comprise receiving user information associated with a user via a user's device. The method may also comprise determining based on the user information, at least a target location to where the user is traveling. The method may further comprise receiving path information associated with one or more intermediary locations leading to the target location, the path information received automatically from one or more sensors installed at the respective intermediary locations for detecting the path information. The method may also comprise estimating a route strategy that meets one or more conditions by analyzing the user information and the path information.

A system for managing routes to meet one or more predetermined conditions, in one aspect, may comprise a server operable to execute on a processor and further operable to receive user information associated with a user via a user's device. The server may be further operable to determine based on the user information, at least a target location to where the user is traveling. The server may be further operable to receive path information associated with one or more intermediary locations leading to the target location, the path information received automatically from one or more sensors installed at the respective intermediary locations for detecting the path information. The server may be further operable to estimate a route strategy that meets one or more conditions by analyzing the user information and the path information. The user information may be automatically obtained from social network profile data associated with the user, electronic calendar data associated with the user, or historical data associated with the user stored in a user profile database, or combinations thereof.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
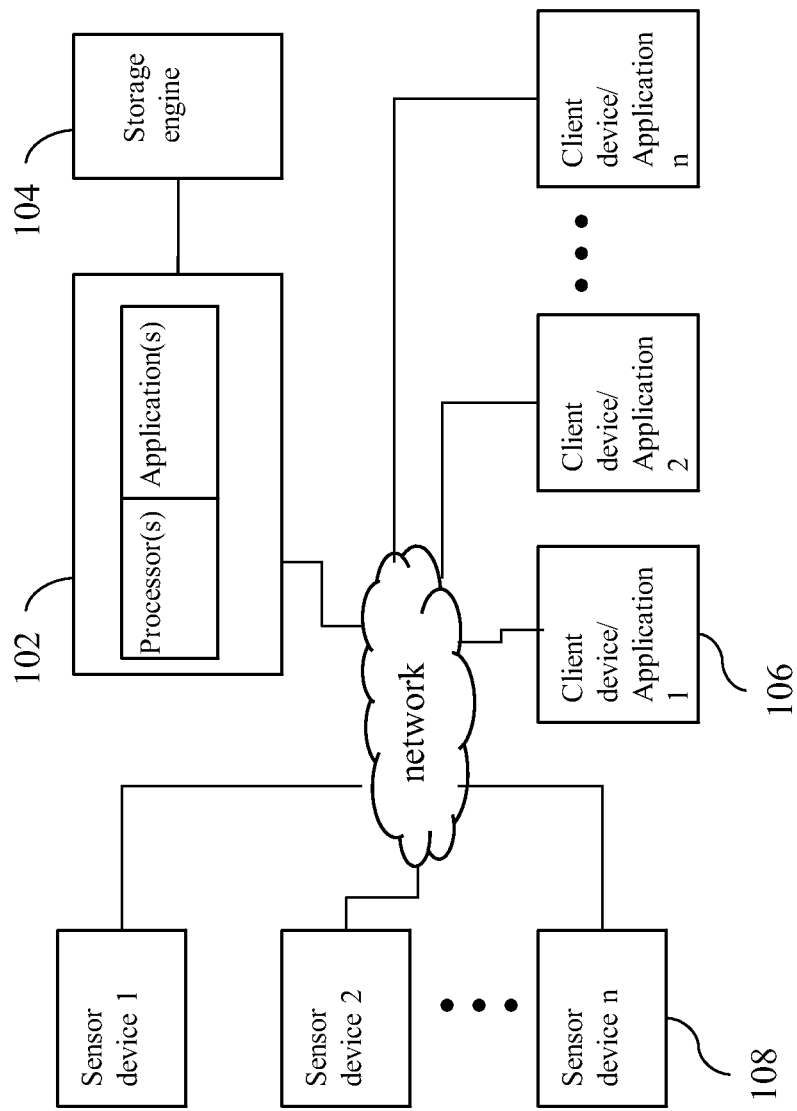
FIG. 1 is a diagram illustrating components of the present disclosure in one embodiment.

A system and method may be provided for enabling users to be informed about what is considered the best or nearly best strategy regarding reaching an event or location given a set of personal conditions and requirements. For instance, information such as how crowded a transportation medium is for traveling to the event or location may be estimated and provided to the user for helping in making a choice as to which path to take. To identify such information, distributed sensor methodologies may be employed. So for example, in order to identify a density of population in trains, sub-ways, buses, and/or other transportation medium, several distributed sensor methods may be utilized.

For example, a traveler's smartphone or like device may have a global positioning system (GPS), and enable access to the traveler's profiles such as schedules stored in an online calendar application, social network profile, and other database data that might be stored on or maintained by the smartphone or the like device. This information may be transmitted to a computer server device or the like. The information, e.g., may indicate the location or event and the time the traveler needs to be there. Taking the information, the computer server may estimate data related to traveling to the location or event, and/or about the location or event. For instance, information related to the location, various paths thereto, conditions relating to traveling to the location or event, and other information may be estimated.

As in the above, some specific examples may include, but are not limited to, the computer server estimating a density of population in moving vehicles and predicting the expected density of travelers at various stops or stations. The estimated density may be estimated per car if the vehicle has multiple cars (e.g., as in subways or trains).

Travelers who are waiting at a stop can also receive such information on their smartphones or the like. The information would aid in allowing the traveler to select a particular stop to board the vehicle or even which car to board (e.g., in case of a subway or train).

This information also may be displayed on screens (electronic boards) attached to the vehicles to indicate occupancy level, for example, coloring a digital band placed on a car of the subway train that represents the density, for example, red to represent more than 100 people in the car, green to represent less than 10.

Cameras or the like may be placed in the vehicles and/or station stops for transmitting information for estimating the density or number of people riding in the vehicles. Microphones may be installed in the vehicles for transmitting audio or noise intensity, which the computer server may be able to translate to density level of the vehicles. Motion detection sensor may be installed and located at doors of the vehicles to detect entering and exiting passengers, and that information may be transmitted to the computer server. From such information the computer server may estimate the density of the vehicles. In another aspect, turnstiles used in transportation systems in stations may be able to detect entering and exiting passengers, from which information the computer server may be able to estimate the population density in the location or area of the turnstiles. Information available on social networks and blogs may be also employed to determine population density.

In another aspect, a system and method may be provided for verification of conditions pre-determined by a user when entering a transportation vehicle. For instance, as discussed above, a sensor may be embedded or installed in parts of the vehicle, for example, to determine people density. Social network data may be used in order to determine if one or more friends and acquaintances are in one of the parts of the vehicle and can be met. For example, such social network or blog data may be analyzed to determine which friend might be traveling in which vehicle. Such social network or blog data may be used to predict the strategy that other people using the vehicle will follow, for example, forecasting based on the analysis of data published in social networks and/or blogs, what they will do. The resulting information may be displayed for the user, for example, on the user's device such as a smartphone.

Information about different users may be received by the computer server. The computer server may analyze and estimate strategies of different users. The estimated strategies of different users may be used to determine strategy of a user. For instance, user A's strategy is determined to be taking path X. User B would like to take different path than user A. Using such information, the computer server determines user B's strategy to be taking path Y, rather than path X.

Conversely, as another example, if user B would like to take the same path as user A, the computer server may determine user B's strategy to be taking path X as well. In such case, an optimal solution may be also provided, for example, suggesting that user A and user B pool together.

In one aspect, a system implementing the above-described methodologies may comprise the following elements. Event tuples <entity, location, time interval> indicate where an entity is at a moment or period of time. The entity may be an event, a person, or an object (e.g., bus, subway). Affinity tuples <entity 1, entity 2, affinity, context> indicate the level of affinity between entity 1 and entity 2 in a context. The context may contain information about time, location, weather, presence of other entities, and others). Relationship tuples <entity 1, entity 2, value, context> indicate the weight (value) of the relation between entity 1 and entity 2 in a context. The tuples are logical elements, which may be implemented as computer data structures.

A storage engine may contain a list of locations, e.g., in a city and/or another location. Level of granularity (i.e., distance between two different locations) may be variable (very short in stadiums and theaters, very large in open fields). This data can be collected and may also updated constantly or periodically from sources such as social networks, from open-access or restricted-access databases from companies, e.g., interested in supplying this information, and/or from tools allowing for direct indication by users. Affinity and relationship tuples may be requested or automatically calculated based on, for example, statistical tools for prediction, association, and causal inference.

A server engine or application module may receive information, for example, from an application module deployed on a portable device (e.g., a smartphone equipped with one or more devices such as GPS sensor) about a user. The received information and the storage engine stored information may be used for analysis. Resulting data (e.g., prediction of strategies, routing path, and others) may be provided. For instance, an algorithm may choose one or more optimal paths containing and/or using criterion associated with an event. The event may be an external event such as a weather system, social event (e.g., sport game), a traffic pattern (e.g., rush hour), disaster (e.g., road washed out), a prediction of any of the foregoing, density of a category of people in a location at some time, and/or others. The event also may be a personal event, e.g., that happens within a social network of the user, information about one or more paths of one or more third party social contacts of the user.

In another aspect, the storage engine may store a data structure containing contact information about one or more of the third party social contacts. The contact information in the data structure may include one or more of the following: contact name, contact origin location, contact destination information, contact travel times, contact calendar information, contact preferences/hobbies/things in common with the user, contact preferred locations (recreational spots, etc.), contact privilege/security/assess information, contact priority (e.g., 1st tier, 2nd tier, etc.) contact category (e.g., close family, near family, business associate), contact status (friend or foe), etc.

The server engine may also comprise an optimizer functionality that may match one or more of the paths of the user to one or more paths of one or more of the contacts. If shared paths are not desirable, the optimizer functionality may suggest a route that minimizes the possibility of having undesired meetings. The optimizer functionality may match a time of travel along the path for the user and one or more of the contacts along with the paths that are matched. The optimizer functionality may also choose one or more intermediate destinations for the user and one or more of the contacts in order to have their paths matched. An intermediate destination may be a preferred location for both the user and the contacts. The optimizer functionality may also match one or more "approximate" path for the user and one or more of the contacts. The optimizer functionality may also match one or more "approximate" travel time for the user and one or more of the contacts. A modified path and/or travel time for the user and/or contact may be suggested so that an exact path and/or time match is established.

The server engine may also predict approximate future path and/or time matches, suggest the future exact path and/or matches, and notify the user and/or contact of the future exact path and/or time and the changes necessary to the user itinerary. A communication function may send such notification of the suggestions to the user and/or contact. The impact of communication on user behavior may be predicted and a communication message may be adjusted to satisfy overall user expectation. Communication may be performed with intelligent agents (e.g., mobile communication devices) associated with users.

FIG. 1 is a diagram illustrating components of the present disclosure in one embodiment. A computer server 102 may include hardware processor and an engine or application module that performs the methodologies described above. A storage engine 104 may store data, such as input data, intermediary data, and resulting data used in the methodologies of the present disclosure. A computer server 102 may receive from one or more client applications 106 (e.g., stored on a client device such as a mobile phone and/or others) data about one or more respective users, such as the calendar schedule information, social network profile information, and others. The computer server 102 may also receive location information from one or more sensors 108 installed in one or more locations. Based on the received information (and additional information stored in the storage engine 104, if needed), the server 102 may compute a strategy desirable to a user, and suggest the strategy to the user.

Figure 2:
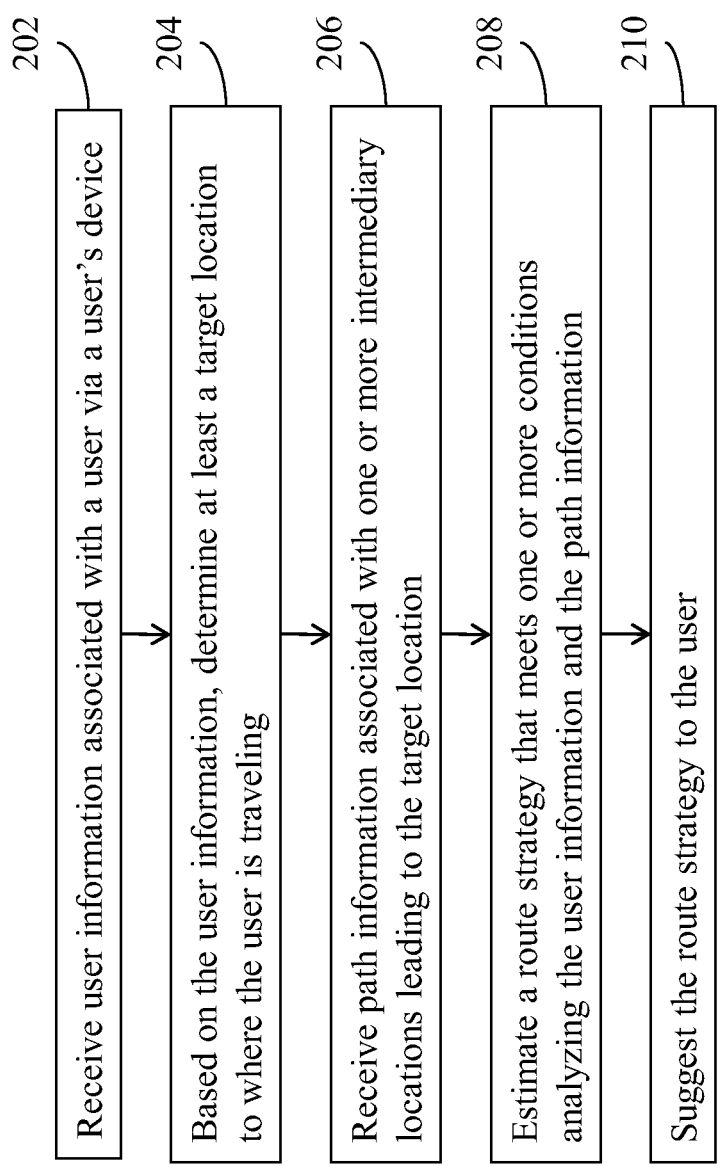
FIG. 2 is a flow diagram illustrating a method of the present disclosure in one embodiment.

FIG. 2 is a flow diagram illustrating a method of the present disclosure in one embodiment. The method, for example, manages routes to meet one or more predetermined conditions. At 202, user information associated with a user may be received via a user's device. As discussed above, for instance, the user information may be automatically obtained from social network profile data associated with the user, electronic calendar data associated with the user, or historical data associated with the user stored in a user profile database, or combinations thereof.

At 204, based on the user information, at least a target location to where the user is traveling may be determined. Time of travel and other information may be also obtained.

At 206, path information associated with one or more intermediary locations leading to the target location may be received. The path information may be received automatically from one or more sensors installed at the respective intermediary locations for detecting the path information. Examples of the path information may include, but are not limited to, population density associated with a vehicle traveling to the target location (e.g., as in subway cars as described above).

At 208, a route strategy that meets one or more conditions may be estimated by analyzing the user information and the path information. The one or more conditions may be user-preferred conditions, for example, specified by the user, or automatically determined based on the user information. Examples of user-preferred conditions may include, but are not limited to, not-crowded transportation vehicle, route that overlaps with another person (e.g., to be able to meet up with that person), route that does not overlap with another person's route (e.g., so as to not meet with that person during the travel) and/or others.

At 210, the estimated route strategy is provided to the user.

Figure 3:
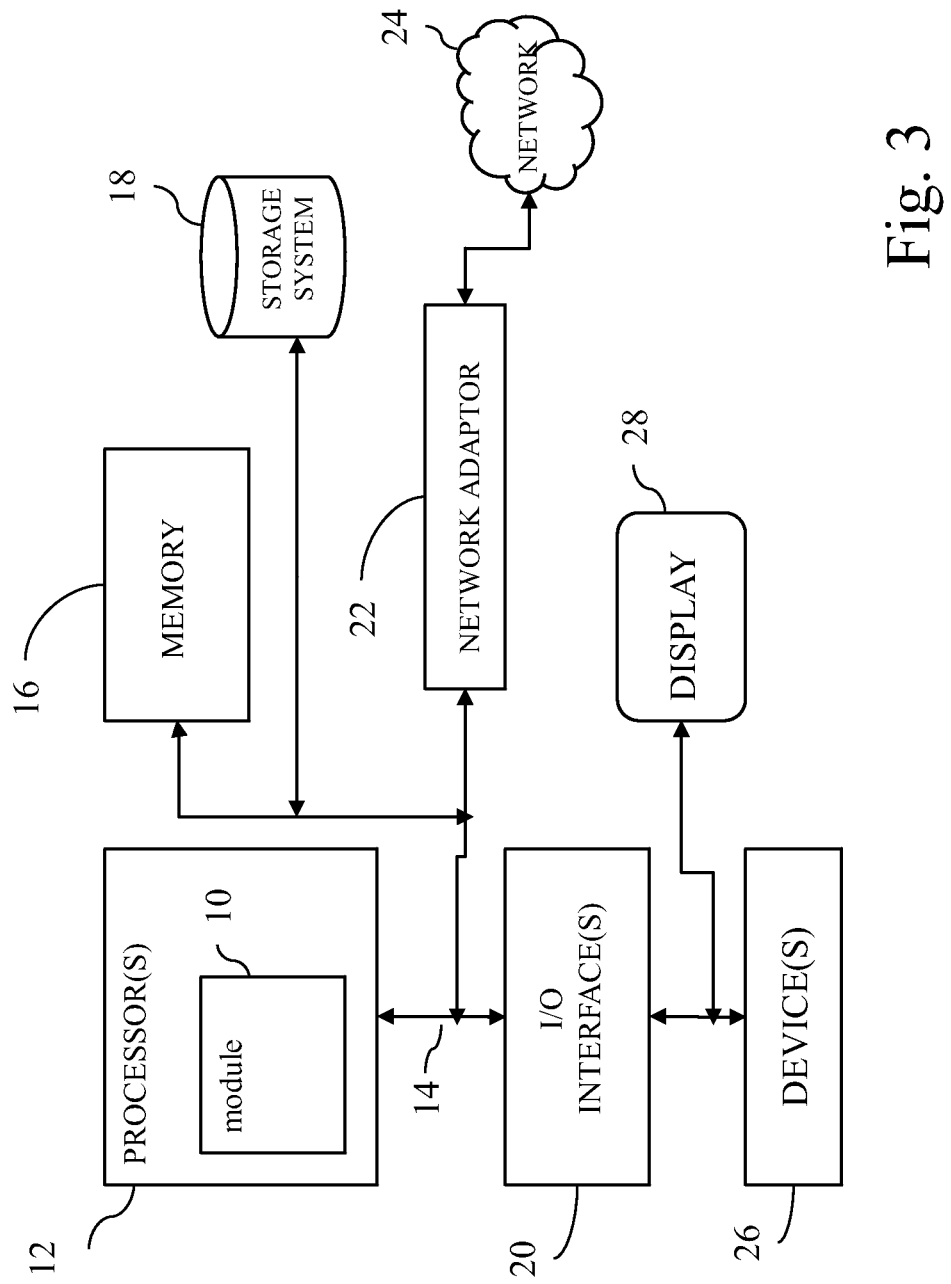
FIG. 3 illustrates a schematic of an example computer or processing system that may implement a system in one embodiment of the present disclosure.

FIG. 3 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, mini-computer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A non-transitory computer readable storage medium storing a program of instructions executable by a machine to perform a method of managing routes to meet one or more predetermined conditions, the method comprising:

receiving user information associated with a user via a user's device;

determining, by a processor, based on the user information, at least a target location to where the user is traveling;

receiving path information associated with one or more intermediary locations leading to the target location, the path information received automatically from one or more sensors installed at the respective intermediary locations for detecting the path information; and estimating a route strategy that meets one or more conditions by analyzing the user information and the path information, wherein the user information comprises a location and time a user needs to be at the location, wherein on-line social media postings associated with a plurality of different users are received and used to estimate route strategies associated with the different users, and based on at least the route strategies associated with the different users, the route strategy of the user is estimated, wherein contact information associated with a social contact is received, the contact information comprising at least contact origin location, contact destination information, and contact travel times, wherein the method further comprises:

based on the contact information and the route strategy, choosing one or more intermediate destinations for the user and the social contact to have paths of the user and the social contact match at a same travel time, and suggesting to modify the route strategy; or based on the contact information and the route strategy, suggesting to modify the route strategy to minimize overlapping of the paths between the user and the social contact, wherein a storage engine stores a plurality of affinity tuples, an affinity tuple of the plurality of affinity tuples comprising a first entity, a second entity, and an affinity indicating a level of affinity between the first entity and the second entity in a context and the context comprising context information, the storage engine further stores a plurality of relationship tuples, a relationship tuple of the plurality of relationship tuples comprising the first entity, the second entity, a weight value associated with a relationship between the first entity and the second entity in the context, and the context, wherein the storage engine automatically computes the affinity tuple and the relationship tuple, wherein the route strategy is estimated based on the affinity tuple and the relationship tuple.

2. The non-transitory computer readable storage medium of claim 1, wherein the user information is automatically obtained from social network profile data associated with the user, electronic calendar data associated with the user, or historical data associated with the user stored in a user profile database, or combinations thereof.

3. The non-transitory computer readable storage medium of claim 1, wherein the one or more conditions are user-preferred conditions.

4. The non-transitory computer readable storage medium of claim 1, wherein the path information comprises a population density associated with a vehicle traveling to the target location.

5. The non-transitory computer readable storage medium of claim 4, wherein the vehicle comprises a multi-car vehicle and the population density is provided for each car of the multi-car vehicle.

6. The non-transitory computer readable storage medium of claim 5, wherein the route strategy comprises selecting a car of the multi-car vehicle that is less densely populated.

7. The non-transitory computer readable storage medium of claim 1, wherein the route strategy comprises selecting a route to the target location that overlaps with a route of the social contact.

8. The non-transitory computer readable storage medium of claim 1, wherein the route strategy comprises selecting a route to the target location that does not overlap with a route of the social contact.

9. The non-transitory computer readable storage medium of claim 1, wherein the user information further comprises time information associated with a time the user should get to the target location.

10. A system for managing routes to meet one or more predetermined conditions, comprising:
   a processor;
   a server operable to execute on the processor and further operable to receive user information associated with a user via a user's device, the server further operable to determine based on the user information, at least a target location to where the user is traveling, the server further operable to receive path information associated with one or more intermediary locations leading to the target location, the path information received automatically from one or more sensors installed at the respective intermediary locations for detecting the path information, the server further operable to estimate a route strategy that meets one or more conditions by analyzing the user information and the path information,
   wherein the user information is automatically obtained from social network profile data associated with the user, electronic calendar data associated with the user, or historical data associated with the user stored in a user profile database, or combinations thereof,
   wherein the user information comprises a location and time a user needs to be at the location,
   wherein on-line social media postings associated with a plurality of different users are received and used to estimate route strategies associated with the different users, and based on at least the route strategies associated with the different users, the route strategy of the user is estimated,
   wherein contact information associated with a social contact is received, the contact information comprising at least contact origin location, contact destination information, and contact travel times, wherein the method further comprises:
   based on the contact information and the route strategy, choosing one or more intermediate destinations for the user and the social contact to have paths of the user and the social contact match at a same travel time, and suggesting to modify the route strategy; or
   based on the contact information and the route strategy, suggesting to modify the route strategy to minimize overlapping of the paths between the user and the social contact,
   wherein a storage engine operable to execute on the processor stores a plurality of affinity tuples, an affinity tuple of the plurality of affinity tuples comprising a first entity, a second entity, and an affinity indicating a level of affinity between the first entity and the second entity in a context and the context comprising context information, the storage engine further stores a plurality of relationship tuples, a relationship tuple of the plurality of relationship tuples comprising the first entity, the second entity, a weight value associated with a relationship between the first entity and the second entity in the context, and the context, wherein the storage engine automatically computes the affinity tuple and the relationship tuple,
   wherein the route strategy is estimated based on the affinity tuple and the relationship tuple.

11. The system of claim 10, wherein the one or more conditions are user-preferred conditions obtained automatically from the user information.

* * * * *